United States Patent [19]

Friehmelt et al.

[11] Patent Number: 4,927,511
[45] Date of Patent: May 22, 1990

[54] METHOD AND DEVICE FOR BREAKING A DISPERSE SYSTEM IN AN ELECTROCHEMICAL CELL

[75] Inventors: Volker Friehmelt, Wollstadt; Bernhard Maier, Amberg; Alfons Kohling, Eschborn; Rolf-Eberhard Schmitt, Nackenheim, all of Fed. Rep. of Germany

[73] Assignee: Battelle-Institut e.V., Frankfurt am Main, Fed. Rep. of Germany

[21] Appl. No.: 271,649

[22] Filed: Nov. 16, 1988

[30] Foreign Application Priority Data

Nov. 23, 1987 [DE] Fed. Rep. of Germany ....... 3739580

[51] Int. Cl.$^5$ .............................................. C02F 1/46
[52] U.S. Cl. ....................................... 204/151; 204/263
[58] Field of Search ................................. 204/151, 263

[56] References Cited

U.S. PATENT DOCUMENTS

| | | | |
|---|---|---|---|
| 3,970,536 | 7/1976 | Shettel | 204/180.1 |
| 4,081,338 | 3/1978 | Golovoy | 204/149 |
| 4,194,972 | 3/1980 | Weintraub | 204/149 |

FOREIGN PATENT DOCUMENTS

| | | |
|---|---|---|
| 0041480 | 5/1981 | European Pat. Off. . |
| 249776 | 9/1967 | Fed. Rep. of Germany . |
| 2301887 | 7/1974 | Fed. Rep. of Germany . |
| 2910314 | 10/1980 | Fed. Rep. of Germany . |
| 2453678 | 11/1980 | France . |
| 2541130 | 8/1984 | France . |

OTHER PUBLICATIONS

Rompps Chemie-Lexikon, (1981), pp. 986, 987 and 1126 and 1130.
D. D. Snyder and R. A. Willihnganz, Proc. Inc. Waste Conf. 31 (1977).
Tanizuka, Noboru, Proc. Int'l Ion Engr. Congress, Kyoto, Japan, (1983) pp. 319 to 324.

*Primary Examiner*—T. M. Tufariello
*Attorney, Agent, or Firm*—Fisher, Christen & Sabol

[57] ABSTRACT

A method and a device for breaking an aqueous emulsion, wherein the emulsion flows through an electrochemical cell in which the small emulsified droplets combine in or on a working electrode to form larger separable droplets. The method can be applied in particular to the breaking of an oil-in-water emulsion.

11 Claims, 2 Drawing Sheets

METHOD AND DEVICE FOR BREAKING A DISPERSE SYSTEM IN AN ELECTROCHEMICAL CELL

BACKGROUND OF THE INVENTION

1. Field Of The Invention

The invention relates to a method of breaking an aqueous emulsion, in particular an oil-in-water emulsion, as well as to a device for carrying out this method.

2. Background Art

Oily emulsions are generated in industry by numerous processes, including drilling and cutting emulsions in mechanical metal working, which are used for cooling and lubrication. These are predominantly oil-in-water emulsions on a mineral oil basis which have been stabilized by emulsifiers and optimized for the respective applications by further additives. In addition, oily waste water is generated by the cleaning of oily and fatty surfaces. Large amounts of oily water result from the production, transport and processing of petroleum.

Breaking of the emulsions may be desirable for two different reasons. On the one hand, it is one of the most important tasks of waste water treatment in order to exclude pollution of surface and ground waters and, on the other hand, breaking is desirable in order to remove the oil content—in particular in petroleum production.

A plurality of methods is known for breaking emulsions. In addition to the classic methods such as distillation, breaking by means of acids, and adsorption, ultrafiltration units have recently been developed. However, these methods involve the disadvantage that the filtration rate decreases with increasing oil concentration, and that ultrafiltration membranes are sensitive to extreme pH values and pollution. Additional disadvantages are that complex processes, chemical additives, and secondary wastes are involved.

In addition, methods have been proposed where emulsions are broken by means of electric current. The method of electroflotation involves the separation of the oil droplets from broken emulsions by means of gas bubbles which can be generated electrolytically in the waste water, for example, by means of plane-parallel perforated electrodes provided on the bottom of the container.

It is necessary, however, first to break the emulsions chemically, e.g., by adding salts or acids and possibly flocculants. This results in a substantial increase in salt concentration in the waste water [E. H. Baer, VDI-Berichte 185, (1972)].

According to another electromechanical method, ferrous salts are introduced into the suspension by anodic dissolution of iron or steel anodes; these ferrous salts are particularly voluminous hydroxides which chemically break the emulsion. In order to reach sufficient conductivity in this case and to prevent passivation of the electrodes, it is necessary to add salts. In this case, also, the salt concentration rises, and the oil is obtained as a sludge of high water content [H. H. Weintraub et al., Electrochem. Soc. Spring Meeting, (May 1976) Abstract No. 261].

In addition, a method of electrophoretically separating emulsions in an electrochemical cell has been proposed. The cell is divided by a diaphragm into an anode chamber and a cathode chamber. The emulsion is fed into the cathode chamber, a d.c. voltage being applied. The negatively charged oil droplets migrate through the diaphragm under the influence of the electric field into the anode chamber where the emulsion is broken by electrochemical action. The oil is obtained as a separate oil layer [D. D. Snyder and R. A. Willihnganz, Proc. Ind. Waste Conf. 31 (1977), 782–791]. This method operates without the addition of chemicals and prevents increases in the salt concentration in the water. A disadvantage of this method is that the breaking efficiency is determined by the migration rate of the oil droplets in the electric field and through the membrane, and, thus, is largely dependent on the type of emulsion. In particular, non-ionic emulsions cannot be broken by this method—electrophoretic migration of the emulsified oil droplets. This means a very strong restriction of its field of application. In addition, high demands are being made on the diaphragm: on the one hand, its porosity must be so high that the migration is not seriously impeded and, on the other hand, the pores may not be so large that they permit marked back-diffusion. The properties are not to change in the course of a long operation time—for example, as a result of pollution.

German Published Patent Application No. 2910314 describes a method of separating particles from suspensions, an electric charge opposite to that of the suspended particles being supplied to the suspension, and the coagulating particles being separated by means of known methods. In order to achieve a sufficiently high electric conductivity, the suspension has to be made strongly acid prior to the separation process.

BROAD DESCRIPTION OF THE INVENTION

The object of the present invention is to provide a method which, while avoiding the known disadvantages of the conventional methods, is independent of the rate of migration of the particles emulsified in water in the electric field and, thus, permits the breaking of different types of emulsions.

The invention involves the application to the breaking an aqueous emulsion of the method of breaking a disperse system which is known from German Published Patent Application No. 2910314, wherein the medium containing the disperse system flows through an electrode compartment in which electric charges are neutralized by means of a working electrode, so that the ultrafine constituents of the system combine to form larger agglomerates which can be separated from the residual medium.

Whereas the known method according to German Published Patent Application No. 2910314 describes the separation of particles according to the described principle from strongly acid suspensions, it was not to be expected that such method would be capable of successfully breaking also aqueous, ionically and no-ionically stabilized emulsions, in particular as it was not to be expected that emulsions would have sufficient electric conductivity to permit the necessary current densities, and also because the resistance of the water which counteracts the combination of the particles emulsified in the water is many times higher than the resistance of a suspension. In addition, it was not to be expected that the film of the separating constituent of the emulsion (oil) would not make the process uneconomical or even impossible. Experiments showed that the process according to the present invention, surprisingly, is feasible.

The method according to the invention is suitable in particular for breaking an oil-in-water emulsion; the method involves substantial advantages in practical application.

The method according to the invention is advantageous if an anionically stabilized emulsion is used and the anode is provided as the working electrode.

Under specific process conditions it may be possible that one of the constituents of the emulsion, e.g., oil, deposits on the surface of the working electrode and, thus, markedly reduces its efficiency, at least after a certain operation time. In order to avoid this, it is preferable to add an additive to the emulsion which reduces or even completely inhibits film formation.

German OS No. 2910314 describes a device for separating particles from suspensions, wherein the suspension is recirculated through an electrocoagulation cell that is subdivided into a cathode chamber and an anode chamber by means of a diaphragm. The cathode chamber contains the cathode which is used as the working electrode. Nothing is said therein on the properties of the diaphragm. Recirculation is supplemented by a storage vessel with pump, valve and rotameter.

To carry out the method according to the invention, essential structural components are used as described in German Published Patent Application No. 2910314, i.e., in particular an electrocoagulation cell which forms the electrode compartment with the working electrode and the counterelectrode. According to the invention, however, the device is not used for separating particles from suspensions, but for breaking an emulsion.

Also, in the case of the device, according to the invention it is advantageous to provide a diaphragm which subdivides the electrode compartment into a cathode chamber and an anode chamber.

A novel and, at the same time, advantageous feature compared with the above-described known device of German OS No. 2910314 is that, according to the invention, the diaphragm is an ion exchanger membrane that is impermeable to the emulsion. In this important embodiment of the device according to the invention, the emulsion flows only through the working electrode chamber and is broken there, because the diaphragm is permeable only to ions, but not to the emulsion or to the constituents separated from the emulsion, e.g., oil droplets.

In addition, it is preferable to attach a separator to the electrocoagulation cell in a circuit; in this separator the respective constituent of the emulsion is separated, which can then be removed from the container.

In order to prevent the constituent separated from the emulsion from adhering to the working electrode surface, a scraper can be attached to the working electrode. This scraper is moved along the surface concerned and thus prevents clogging of the respective electrode surface.

To this end, it is preferable to provide the scraper as a magnetic bar which is moved by a driven magnet arranged outside of the cell. This is not a sophisticated apparatus and does not require the cell wall to be drilled through for the drive of the scraper, although this would also be possible for moving the scraper.

The working electrode can be a metal sheet, a screen or a chip bed. Preferably, it has the largest possible specific surface area.

In addition, it is preferable if the working electrode consists of a corrosion-resistant material. Thus, it is prevented that the working electrode corrodes or dissolves; this would result in additional salinity of the emulsion to be broken, e.g., in an increase in the concentration, e.g., of metal salts in waste water. In this context, it should be noted that an additional preferred application of the method and the device according to the invention is sewage treatment.

The process can also be carried out without a diaphragm in the cell. In this case, too, the breaking of the emulsion takes place in an undivided cell by coagulation of the respective constituent of the emulsion (oil) in the region of the working electrode. It should be noted, however, that diffusions and convections inside of the cell cannot be avoided, so that the break is partly cancelled again by back-emulsification. For this reason, this process without the diaphragm should be carried out in particular at low amperages and low terminal voltage, which would necessitate longer reaction times and larger quantities of electricity.

It is also possible to carry out the process in such a way that the cationically stabilized emulsion that flows through the working electrode chamber is broken by reversal of polarity of the electrodes at the working electrode which is then operating as cathode.

In general, the process conditions should be selected such that practically no gas is generated at the working electrode during breaking. Only after termination of breaking of the emulsion can generation of gas at the working electrode be observed, which indicates the end of the breaking process.

BRIEF DESCRIPTION OF THE DRAWINGS

In the following, the invention is described in detail on the basis of embodiments from which further important features result. In the drawings.

DETAILED DESCRIPTION OF THE INVENTION

Figure 1:
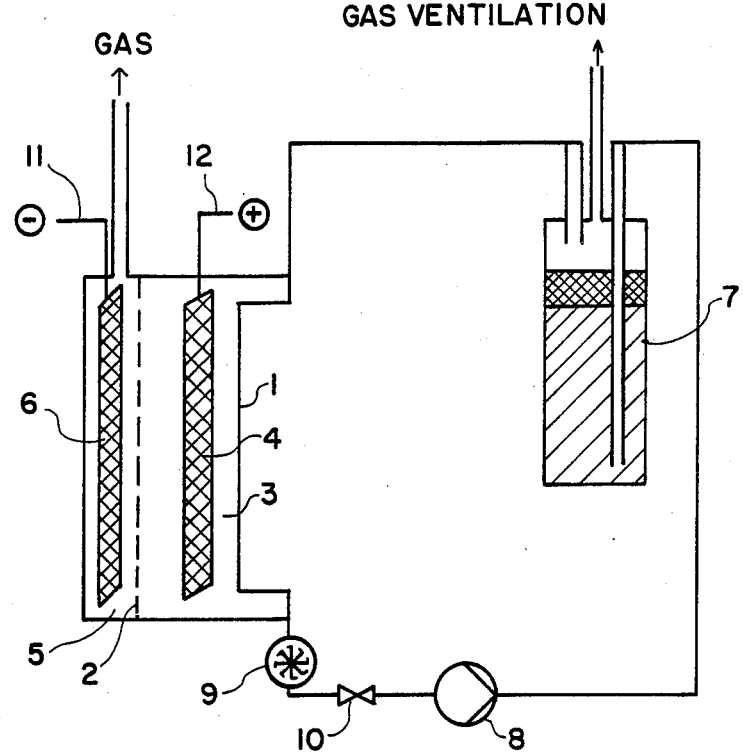
FIG. 1 shows the principle of a first embodiment of a device of the invention for breaking an emulsion.

An electrocoagulation cell 1 according to the invention is divided into an anode chamber 3 with an anode 4 and into a cathode chamber 5 with a cathode 6 by means of a diaphragm 2. The diaphragm 2 consists preferably of a membrane that is permeable to oil or emulsions, in order largely to inhibit mixing of the liquids of the working electrode and counterelectrode chambers. In addition to noble metals, also platinized titanium, tantalum or niobium, nickel or graphite can be used as the anode material. Such electrodes are as stable as platinum and are today used in industrial processes. The cathode material can be a material that is stable under the process conditions, e.g., titanium, platinized titanium, tantalum, graphite, etc.

According to the embodiment shown in FIG. 1, an emulsion is fed, with the aid of a pump 8, from a separator and storage container 7 in the direction of the arrow 0 into the electrocoagulation cell 1. Here the suspension enters the anode chamber from below, passes the anode 4 which is used as working electrode, and then flows back into the container 7. The flow rate can be measured by means of a rotameter 9, and controlled by means of the pump 8 or a valve 10. The electrolyte chamber of the cathode 5 is filled with water or with an aqueous conductive solution and separated from the anode chamber by the ion exchanger membrane. A voltage source is connected to the current feeder lines 11 and 12, and the current is adjusted so that a predetermined limit value is not exceeded. The flowing d.c. current supplies an electric charge to the dispersed droplets (oil droplets) which induces them to combine to yield larger separable droplets. The depleted emulsion and the separated oil leave the cell and flow back into the container 7. The emulsion is recirculated by pumping until the desired reduction in the content of emulsified medium (oil) is reached. In the case of continuous operation, the emulsion can be fed into further coagulation cells. The separated constituent (oil) of the emulsion is taken from the surface of the emulsion in container 7 using conventional means, e.g., an outlet (not shown in the drawing) at the container 7. The openings 13, 14 serve for discharging gases from the cell 1 and the container 7.

Figure 2:
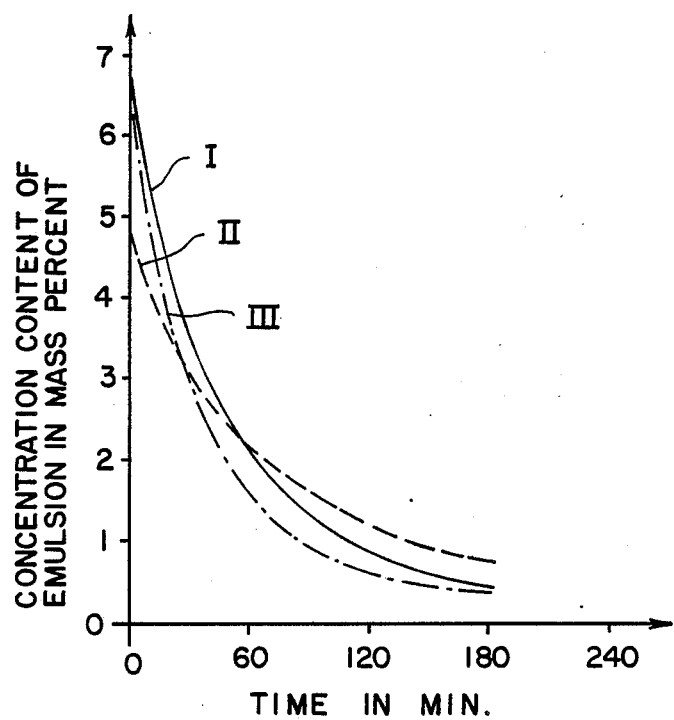
FIG. 2 shows the results according to the following Examples 1 to 3.

FIG. 2 shows the results of emulsion breaking carried out by means of the device according to FIG. 1. The concentration of the emulsion is plotted in mass percent as a function of time (in minutes). Curves I and III indicate the electrocoagulation experiments recirculated anionically stabilized emulsions, and Curve II shows the results obtained with a recirculated, non-ionically stabilized emulsion. Details are discussed below.

Figure 3:
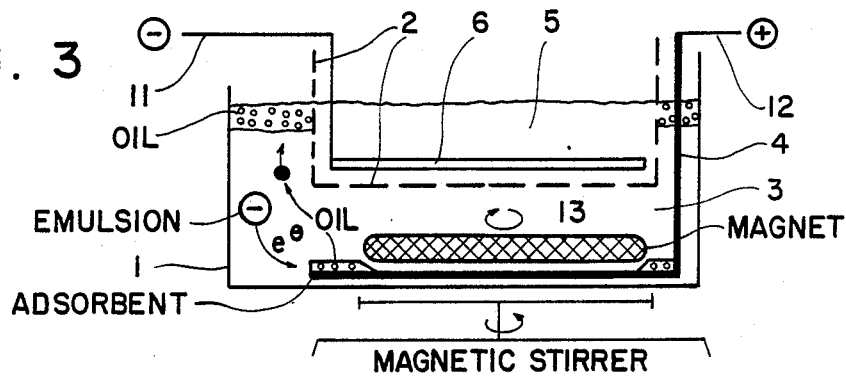
FIG. 3 shows the principle of a laboratory unit with mechanical scraper.
Figure 4:
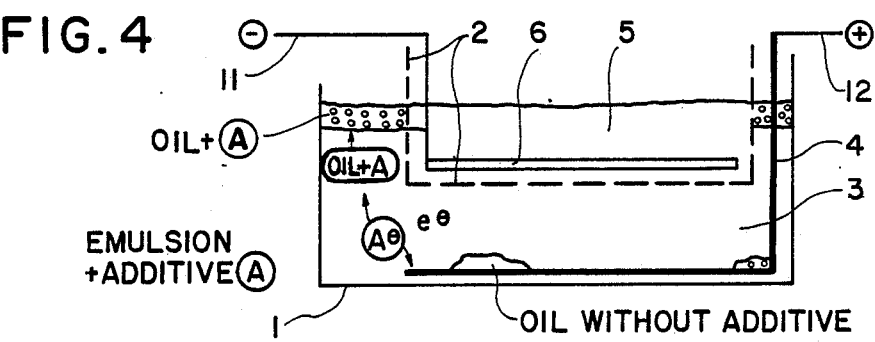
FIG. 4 shows an arrangement similar to FIG. 3 in which the mechanical scraper has been replaced by an additive in the emulsion.

FIGS. 3 and 4 show laboratory devices in which the emulsion was not recirculated. Cell 1 has basically the same design as indicated in FIG. 1, and the same reference numerals are used. In this emodiment, the working electrode 4 is arranged horizontally in the lower region of the cell 1. On its active surface, a magnetic stirrer 15 is provided as a scraper. Outside of the cell 1 and adjacent to the stirrer 15, a magnetic stirrer drive 16 is provided, which is rotated by an appropriate means. The magnetic stirrer drive 16 moves the stirrer 15, such that the latter, by its movement, strips the oil film adhering to the active surface of the working electrode 4 and causes it to rise to the surface, as is indicated in the drawing. This results in an oil layer 17 which floats on the surface of the emulsion. The oil film generated on the active surface of the working electrode is indicated at Item 18. In addition, it is schematically shown how a negatively charged particle 19 of the emulsion is attracted by the positively charged working electrode (anode) 4, to which it adheres to form larger oil droplets 20, which then rise to the surface to form the oil layer 17.

FIG. 3 shows electrocoagulation of an anionically stabilized emulsion without recirculation, with the mechanical scraper at the working electrode (here anode), in a laboratory device.

FIG. 4 shows basically the same design as shown in FIG. 3, but without the scraper 15 with magnetic stirrer drive 16. Instead, the emulsion contains an appropriate additive 21 for avoiding or minimizing formation of an oil film on the working electrode. Also, the emulsion according to FIG. 4 has been anionically stabilized. At item 22 it is indicated how oil without additive adheres to the surface of the working electrode.

The following examples describe experiments which are carried out both with a laboratory device using recirculation (FIG. 1) and with laboratory devices without recirculation (FIGS. 3, 4). The experimental volumes amounted to 100 to 200 ml.

EXAMPLE 1

A commercial emulsion with a concentrate content of 7 weight percent corresponding to an oil content of 3.5 weight percent, and an anionic emulsifier were filled into the storage container, heated to about 50° C. and pumped through the anode chamber of the coagulation cell at a flow rate of 2 l/h. The electrode material used for the anode as working electrode was a platinized titanium expanded metal, and the material for the cathode as counterelectrode was titanium expanded metal. The geometric surface area of the anode was about 50 cm$^2$. Then the cell was charged with d.c. of 0.5 A corresponding to a current density of about 10 mA/cm$^2$. The decrease of the oil concentration as a function of time was used as the measure of the coagulation rate. The result of the experiment is presented as Curve I in FIG. 2. The duration of the experiment is plotted on the abscissa in minutes, and the respective concentrate content in weight percent is plotted on the ordinate. The oil concentration first decreases rapidly, and more slowly with decreasing oil content. Ninety percent of the original oil content is coagulated within a period of about two hours. The progress of coagulation can also be visually observed: the initially milky blue solution becomes increasingly lighter, and finally appears optically clear. The coagulated oil droplets form a separate layer in the storage container.

EXAMPLE 2

Under the same conditions as described for Example 1, a greenish-yellow fluorescing emulsion stabilized by non-ionic emulsifiers, with a concentrate content of 5 weight percent corresponding to an oil content of 1 weight percent, was treated. As compared with the coagulation of anionic emulsions, coagulation in this case proceeds at a slightly lower rate. Ninety percent of the original oil content was coagulated within about three hours. The experimental result is shown as Curve II in FIG. 2.

EXAMPLE 3

For this experiment, the free volume of the working electrode chamber was filled with coarse chips of platinized titanium. This chip bed is so porous that the flow rate of the emulsion is not markedly affected. Under conditions otherwise identical with those in Example 1—200 ml of an anionic emulsion, operating temperature 50° C., and amperage 0.5 A—the coagulation rate was raised. Ninety percent of the original oil content was coagulated within about 90 minutes. The experimental result is shown as Curve III in FIG. 2.

EXAMPLE 4

Figure 5:
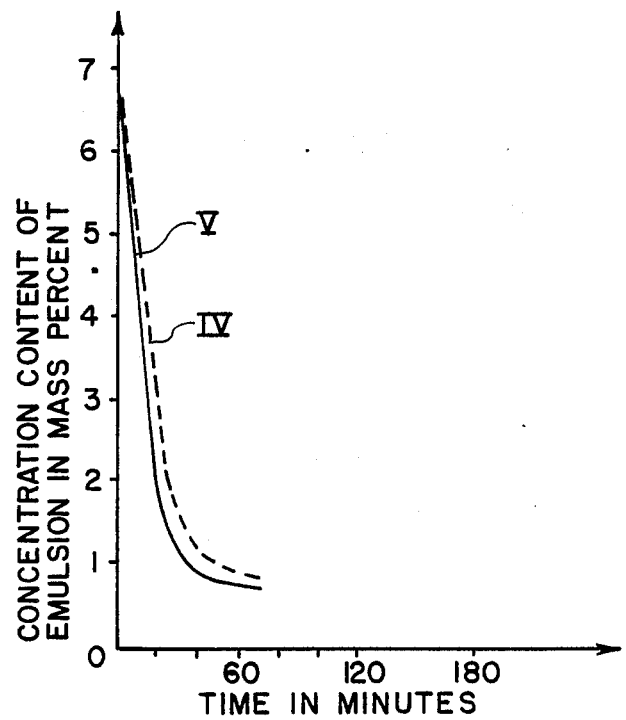
FIG. 5 shows the results obtained with the arrangements according to FIGS. 3 and 4.

The mode of operation of a mechanical scraper 15 (FIG. 3) was determined in a device without recirculation on sheet-metal electrodes. In a glass container containing 100 ml of the anionic emulsion, the oil film generated on a horizontal anode was continuously stripped by means of a magentically moved stirrer. As compared with reference experiments without the mechanical stripping of the oil film, emulsion breaking with the mechanical stripping of the oil film was faster by a factor of 2 to 4. In experiments without the stripping of the oil film, the amperage decreases with increasing duration of the experiment, in spite of constant terminal voltage. Such a decrease in amperage is not observed in the case of the continous stripping of the oil film. The experimental result is shown as Curve IV in FIG. 5.

EXAMPLE 5

The addition of additives, e.g., of ethyl acetate, heptane, petroleum ether or mixtures of such compounds, has the same effect as the mechanical stripping of the oil film (FIG. 4). Such additives obviously are absorbed by the emulsified oil droplets and largely minimize the generation of an oil film if the physical properties are varied—reduction of density and adsorbability. As compared with reference experiments without additives, emulsion breaking is faster by a factor of 3 to 5. The experimental result is shown as Curve V in FIG. 5.

The possibly advantageous additives which minimize oil film generation can be recovered practically quantitatively from the separated oil, e.g., by distillation at low temperatures, and recycled to the process.

What is claimed is:

1. Method of breaking a disperse system in form of oil-in-water emulsions, comprising: neutralizing the electrical charges in a medium containing a non-ionically or ionically stabilized oil-in-water emulsion flowing through a working electrode compartment within an electrode compartment subdivided by an ion exchanger membrane into a working electrode compartment and a counterelectrode compartment such that the ultrafine constituents of the emulsion combine to form larger agglomerates using a working electrode consisting of a corrosion-resistant material; and separating the agglomerated constituents from the residual medium outside of said electrode compartment in a separator attached thereto in a circuit.

2. Method as claimed in claim 1 wherein the water-in-oil emulsion is recirculated from said separator into said electrode compartment and back again by pumping until a desired separation is reached.

3. Method according to claim 1 wherein an additive is added to the emulsion, said additive reducing the film formation of one of the constituents of the emulsion on the working electrode.

4. Method according to claim 1 wherein a film of one of the constituents of the emulsion formed on the working electrode is removed by means of a magnetic bar provided adjacent the working electrode and being magnetically driven from outside of the electrode compartment.

5. Method according to claim 1 wherein the working electrode is a metal sheet, a screen or a chip bed made from titanium, platinized titanium, niobium, nickel, tantalum or graphite.

6. Method of breaking a disperse system in form of oil-in-water emulsions, comprising:
neutralizing the electrical charges in a medium containing a non-ionically or ionically stabilized oil-in-water emulsion flowing through a working electrode compartment within an electrode compartment subdivided by an ion exchanger membrane into a working electrode compartment and a counterelectrode compartment such that the ultrafine constituents of the emulsion combine to form larger agglomerates using a working electrode consisting of a corrosion-resistant material;
separating the agglomerated constituents from the residual medium; and
removing a film of one of the constituents of the emulsion formed on the working electrode by means of a magnetic bar provided adjacent the working electrode and being magnetically driven from outside the electrode compartment.

7. Apparatus for breaking a disperse system in form of oil-in-water emulsions, comprising an electrode compartment subdivided by an ion exchanger membrane into a working electrode compartment and a counterelectrode compartment for neutralizing the electrical charges in a medium containing a non-ionically or ionically stabilized oil-in-water emulsion flowing through said working electrode compartment such that the ultrafine constituents of the emulsion combine to form larger agglomerates using a working electrode provided in said working electrode compartment and consisting of a corrosion-resistant material.

8. Apparatus for breaking a disperse system in form of oil-in-water emulsions, comprising an electrode compartment subdivided by an ion exchanger membrane into a working electrode compartment and a counterelectrode compartment for neutralizing the electrical charges in a medium containing a non-ionically or ionically stabilized oil-in-water emulsion flowing through said working electrode compartment such that the ultrafine constituents of the emulsion combine to form larger agglomerates using a working electrode provided in said electrode compartment and consisting of a corrosion-resistant material; and wherein the working electrode is a metal sheet, a screen or a chip bed made from titanium, platinized titanium, niobium, nickel, tantalum or graphite.

9. Apparatus for breaking a disperse system in form of oil-in-water emulsions, comprising:
an electrode compartment subdivided by an ion exchanger membrane into a working electrode compartment and a counterelectrode compartment for neutralizing the electrical charges in a medium containing a non-ionically or ionically stabilized oil-in-water emulsion flowing through said working electrode compartment such that the ultrafine constituents of the emulsion combine to form larger agglomerates using a working electrode provided in said working electrode compartment and consisting of a corrosion-resistant material;
a separator attached to said electrode compartment within a circuit for separating the agglomerated constituents from the residual medium; and
a magnetic bar for removing a film of one of the constituents of the emulsion formed on the working electrode, said magnetic bar being provided adjacent the working electrode; and a driven magnet being provided outside said electrode compartment for moving said bar.

10. Apparatus for breaking a disperse system in form of oil-in-water emulsions, comprising:
an electrode compartment subdivided by an ion exchanger membrane into a working electrode compartment and a counterelectrode compartment for neutralizing the electrical charges in a medium containing a non-ionically or ionically stabilized oil-in-water emulsion flowing through said working electrode compartment such that the ultrafine constituents of the emulsion combine to form larger agglomerates using a working electrode provided in said electrode compartment and consisting of a corrosion-resistant material;
a separator attached to said electrode compartment within a circuit for separating the agglomerated constituents from the residual medium;

means for recirculating the water-in-oil emulsion from said separator into said electrode compartment and back again by pumping until a desired separation is reached; and a magnetic bar for removing a film of one of the constituents of the emulsion formed on the working electrode, said magnetic bar being provided adjacent the working electrode and a driven magnet being provided outside said electrode compartment for moving said bar;

and wherein the working electrode is a metal sheet, a screen or a chip bed made from titanium, platinized titanium, niobium, nickel, tantalum or graphite.

11. Method of breaking a disperse system in form of oil-in-water emulsions, comprising:

neutralizing the electrical charges in a medium containing a non-ionically or ionically stabilized oil-in-water emulsion flowing through an electrode compartment by means of a working electrode such that the ultrafine constituents of the emulsion combine to form larger agglomerates in the region of said working electrode, said electrode compartment being an undivided cell containing said working electrode and a counterelectrode; and separating the agglomerated constituents from the residual medium.

* * * * *